United States Patent
De Palo et al.

(10) Patent No.: US 12,049,713 B2
(45) Date of Patent: Jul. 30, 2024

(54) POLYOLEFIN FIBRES

(71) Applicant: BASELL POLIOLEFINE ITALIA S.R.L., Milan (IT)

(72) Inventors: Roberto De Palo, Ferrara (IT); Gianluca Musacchi, Ferrara (IT); Renaud Lemaire, Brussels (BE); Jaume Marti Porqueres, Reus (ES)

(73) Assignee: Basell Poliolefine Italia S.r.l., Milan (IT)

( * ) Notice: Subject to any disclaimer, the term of this patent is extended or adjusted under 35 U.S.C. 154(b) by 444 days.

(21) Appl. No.: 17/312,280

(22) PCT Filed: Dec. 17, 2019

(86) PCT No.: PCT/EP2019/085692
§ 371 (c)(1),
(2) Date: Jun. 9, 2021

(87) PCT Pub. No.: WO2020/127296
PCT Pub. Date: Jun. 25, 2020

(65) Prior Publication Data
US 2022/0106717 A1    Apr. 7, 2022

(30) Foreign Application Priority Data
Dec. 19, 2018 (EP) .................................. 18213976

(51) Int. Cl.
*D01F 8/06* (2006.01)
*C08L 23/12* (2006.01)
*C08L 23/14* (2006.01)
*C08L 23/20* (2006.01)
*D01F 6/46* (2006.01)
*D04H 1/4291* (2012.01)
*D04H 1/4382* (2012.01)

(52) U.S. Cl.
CPC .............. *D01F 8/06* (2013.01); *C08L 23/12* (2013.01); *C08L 23/142* (2013.01); *C08L 23/20* (2013.01); *D01F 6/46* (2013.01); *D04H 1/4291* (2013.01); *D04H 1/43828* (2020.05); *D04H 1/43832* (2020.05); *C08L 2203/12* (2013.01); *C08L 2205/025* (2013.01); *C08L 2205/03* (2013.01); *D10B 2321/022* (2013.01)

(58) Field of Classification Search
CPC ... D01F 6/46; D01F 8/06; C08L 23/20; C08L 23/12; C08L 23/142; C08L 23/18; C08L 2203/12
See application file for complete search history.

(56) References Cited

U.S. PATENT DOCUMENTS

| | | | |
|---|---|---|---|
| 5,547,746 A * | 8/1996 | Burton, Sr. | B32B 5/022 |
| | | | 525/88 |
| 11,267,912 B2 * | 3/2022 | Marchini | B01J 19/0046 |
| 2004/0096682 A1* | 5/2004 | Kanamaru | B32B 27/32 |
| | | | 428/500 |
| 2012/0171393 A1 | 7/2012 | de Palo et al. | |
| 2013/0217831 A1 | 8/2013 | Vanzini et al. | |

FOREIGN PATENT DOCUMENTS

| | | | | |
|---|---|---|---|---|
| CN | 103756143 A | | 4/2014 | |
| GB | 2282101 A | * | 3/1995 | ........... A61L 15/225 |
| JP | H01246413 A | | 10/1989 | |
| JP | 2005097558 A | | 4/2005 | |
| JP | 2007321098 A | | 12/2007 | |
| JP | 2008524415 A | | 7/2008 | |
| JP | 2011506716 A | | 3/2011 | |
| JP | 2015107612 A | | 6/2015 | |
| WO | WO-03099883 A1 | * | 12/2003 | ............. C08F 10/08 |
| WO | 2004099269 A2 | | 11/2004 | |
| WO | 2005005495 A2 | | 1/2005 | |
| WO | 2008017525 A1 | | 2/2008 | |
| WO | 2009000637 A1 | | 12/2008 | |
| WO | 2009080435 A1 | | 7/2009 | |
| WO | 2010069775 A1 | | 6/2010 | |
| WO | 2018007280 A1 | | 1/2018 | |

OTHER PUBLICATIONS

International Search Report and Written Opinion Mailed Mar. 24, 2020 (Mar. 24, 2020) For Corresponding PCT/EP2019/085692.

* cited by examiner

*Primary Examiner* — Jennifer A Gillett

(57) ABSTRACT

A polyolefin composition for preparing fibers, made from or containing:
A) 60-95% by weight of a propylene homo- or copolymer; and
B) 5-40% by weight of a copolymer of butene-1 or a butene-1 polymer composition having:
a Melt Flow Rate value of from 5 to 100 g/10 min., measured according to ISO 1133 at 190° C. with a load of 2.16 kg;
a copolymerized comonomer content from 4% to 15% by mole, referred to the total weight of B);
a Mw/Mn value equal to or lower than 4; and
flexural modulus of 80 MPa or higher.

6 Claims, No Drawings ably of 115 MPa or# POLYOLEFIN FIBRES

This application is the U.S. National Phase of PCT International Application PCT/EP2019/085692, filed Dec. 17, 2019, claiming benefit of priority to European Patent Application No. 18213976.6, filed Dec. 19, 2018, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to polyolefin fibers, articles produced therefrom, and a polyolefin composition for the preparation of the fibers.

BACKGROUND OF THE INVENTION

In some instances, fibers made from a blend of a propylene polymer and a butene-1 polymer exhibit good softness and elastic recovery when compared to fibers made from the propylene polymer in absence of the butene-1 polymer. However, the tenacity and elongation of the fibers prepared from the blended polymers are not improved when compared to the propylene-polymer fibers.

SUMMARY OF THE INVENTION

In a general embodiment, the present disclosure provides a polyolefin composition made from or containing:
A) 60-95% by weight, alternatively 65-95% by weight, alternatively 65-92% by weight, of a propylene homopolymer with an isotactic index (percentage by weight of fraction insoluble in xylene at 25° C.) higher than 80, alternatively between 90 and 98, or
  a crystalline copolymer of propylene with ethylene and/or one or more alpha-olefins having 4-10 carbon atoms, containing 85% by weight or more of propylene and having an isotactic index equal to or higher than 80, or a blend thereof; and
B) 5-40% by weight, alternatively 5-35% by weight, alternatively 8-35% by weight, of
  (I) a copolymer of butene-1 with one or more comonomers selected from ethylene and higher alpha-olefins or
  (II) a composition of butene-1 polymers made from or containing a copolymer of butene-1 with one or more comonomers selected from ethylene and higher alpha-olefins, wherein the copolymer (I) or the composition (II) having:
    a MFRE value of from 5 to 100 g/10 min., alternatively from 20 to 100 g/10 min., alternatively from 25 to 95 g/10 min., alternatively from 30 to 80 g/10 min., wherein MFRE is the Melt Flow Rate, measured according to ISO 1133 at 190° C. with a load of 2.16 kg (condition E);
    a copolymerized comonomer content from 4% to 15% by mole, alternatively from 4% to 10% by mole, alternatively from 5% to 10% by mole, referred to the total weight of B);
    a Mw/Mn value, where Mw is the weight average molar mass and Mn is the number average molar mass, both measured by GPC, equal to or lower than 4; and
    a flexural modulus of 80 MPa or higher, alternatively of 100 MPa or higher, alternatively of 115 MPa or higher;
wherein the amounts of A) and B) are referred to the total weight of A)+B).

The total weight of A)+B) amounts to 100%.

In some embodiments, the fibers obtained from the polyolefin composition are used to prepare textile articles, alternatively non-woven fabrics, having high values of tenacity and elongation both in the Machine Direction (MD) and Transverse Direction (TD).

DETAILED DESCRIPTION OF THE INVENTION

As used herein, the term "fibers" includes spun bond fibers and filaments. As used herein, the term "filaments" is used interchangeably with the terms "continuous fibers" and "continuous strands".

In some embodiments, the polyolefin fibers are used for producing non-woven fabrics, alternatively disposable diapers.

As used herein, the term "copolymer" refers to both polymers with two different monomer recurring units and polymers with more than two different monomer recurring units in the chain, such as terpolymers.

In some embodiments, the propylene polymer component (A) has a value of Melt Flow Rate MFRL from 10 to 50 g/10 min., alternatively from 15 to 35 g/10 min., measured according to ISO 1133 at 230° C., 2.16 Kg (condition L). It is believed that high Melt Flow Rate values are obtained directly in polymerization or by controlled radical degradation of the polymer by adding free-radical generators, such as organic peroxides, in the spinning lines or during previous pelletizing stages of the olefin polymers.

In some embodiment, the polymer component (A) exhibits a molecular weight distribution (Mw/Mn) measured according to the method specified below, ranging from 2 to 8.

In some embodiments, the polymer component (A) is produced with a Ziegler-Natta catalyst and has Mw/Mn values in the range of from 3 to 8, alternatively from 3.2 to 6.

In some embodiments, the polymer component (A) is produced with a metallocene catalyst and has Mw/Mn values in the range of from 2 to 3, alternatively from 2.4 to 2.6.

The polymer component (A) exhibits a stereoregularity of the isotactic type. In some embodiments, the polymer component (A) is a propylene homopolymer or a random copolymer of propylene with ethylene and/or alpha-olefins having 4-10 carbon atoms, such as copolymers and terpolymers of propylene. In some embodiments, the polymer component (A) is a blend of the polymers, wherein the mixing ratios are variable. In some embodiments, the alpha-olefin comonomer or comonomers are selected from the group consisting of ethylene, butene-1, pentene-1, hexene-1, heptene-1, octene-1, nonene-1, decene-1 and 4-methyl-1-pentene. In some embodiments, the amount of comonomer content is from 1% to 15% by weight, with respect to the total weight of the single copolymers present in (A), if any.

In some embodiment, the comonomers are selected from the group consisting of ethylene and butene-1.

In some embodiments, the polymer component (A) is produced by polymerizing propylene and, optionally, one or more alpha-olefins, in the presence of a polymerization catalyst, such as a stereospecific Ziegler-Natta catalysts or a metallocene catalyst.

In some embodiments, the polymer component (A) obtained with a metallocene based catalyst is obtained by using, as metallocene compound, a bridged benzoindenyl zirconium dichloride. In some embodiments, the compound is supported on silica and activated by using an alumoxane, alternatively methylalumoxane. In some embodiments, the polymer is obtained with a process in slurry by using propylene monomer as diluent. In some embodiments, the process and catalyst are as described in Patent Cooperation Treaty Publication No. WO2005005495 A1.

In some embodiments, the polymer component (A) obtained with a stereospecific Ziegler-Natta catalyst in prepared in slurry with propylene monomer as diluent. In some embodiments, the stereospecific Ziegler-Natta catalysts are made from or containing a solid catalyst component made from or containing at least one titanium compound having at least one titanium-halogen bond and at least an electron-donor compound (internal donor), both supported on a magnesium chloride compound. In some embodiments, the Ziegler-Natta catalyst systems further is made from or containing an organo-aluminum compound as co-catalyst and optionally an external electron-donor compound. In some embodiments, the internal electron-donor compound is selected from phthalates, 1,3-diethers and succinates. In some embodiments, the polymerization process is carried out in liquid phase, using liquid propylene as the main diluent (bulk polymerization). In some embodiments, the bulk polymerization is carried out in one or more loop reactors which are connected in series.

In some embodiments and in component (B), the butene-1 copolymer or copolymers are made from or containing one or more comonomers selected from ethylene and higher alpha-olefins.

In some embodiments, the butene-1 polymer component (B) is a composition (II) made from or containing:

$B^I$) a butene-1 homopolymer or a copolymer of butene-1 with one or more comonomers selected from ethylene and higher alpha-olefins, having a copolymerized comonomer content ($C_A$) of up to 5% by mole, alternatively up to 4% by mole; and $B^{II}$) a copolymer of butene-1 with one or more comonomers selected from ethylene and higher alpha-olefins, having a copolymerized comonomer content ($C_B$) of from 6% to 20% by mole, alternatively from 8% to 18% by mole;

wherein the composition having a content of fraction soluble in xylene at 0° C. of 75% by weight or less, alternatively of 70% by weight or less, determined on the total weight of $B^I$) and $B^{II}$).

In some embodiments, amounts of fraction soluble in xylene at 0° C. for the butene-1 polymer composition (II), expressed as the weight content of fraction measured by extraction on the total weight of $B^I$) and $B^{II}$), are of from 35% to 75% by weight, alternatively from 35% to 70% by weight, alternatively from 40% to 70% by weight, alternatively from 40% to 65% by weight.

In some embodiments, $B^I$) is a copolymer and the lower limit of comonomer content is of 1% by mole.

In some embodiments, both $B^I$) and $B^{II}$) are copolymers and the difference between the percent values of the copolymerized comonomer contents of $B^I$) and $B^{II}$) satisfies the following relation:

$C_B - C_A \geq 5$; or $C_B - C_A \geq 6$.

In some embodiments, the relative amounts of components $B^I$) and $B^{II}$) is determined depending upon the total copolymerized comonomer content, the comonomer contents of the single components and the components' content of fraction soluble in xylene at 0° C.

In some embodiments, amounts are from 30% to 70% by weight, alternatively from 35% to 65% by weight, of $B^I$) and from 30% to 70% by weight, alternatively from 35% to 65% by weight, of $B^{II}$), wherein the amounts are referred to the total weight of $B^I$) and $B^{II}$)

In some embodiments, the MFRE values for components $B^I$) and $B^{II}$) are selectable, provided that the MFRE values of the overall composition are obtained.

It is believed that the logarithm of the MFR value of polyolefin blends is given by the sum of the products of the weight fraction and the logarithm of the MFR value of the single components. It is further believed that this logarithmic relationship applies to blends of butene-1 polymers.

Therefore, the MFRE value of a composition made of a blend of components $B^I$) and $B^{II}$) is determined by the following relation:

$$\log \mathrm{MFRE}(B^I + B^{II}) = wB^I \log \mathrm{MFRE}(B^I) + wB^{II} \log \mathrm{MFRE}(B^{II})$$

where MFRE ($B^I + B^{II}$) is the MFRE value for the blend of $B^I$) and $B^{II}$), MFRE ($B^I$) and MFRE ($B^{II}$) are the MFRE values of components $B^I$) and $B^{II}$) respectively and $wB^I$ and $wB^{II}$ are the respective weight fractions. For instance, $wB^I$ and $wB^{II}$ are both 0.5 when the blend is made of 50% by weight of $B^I$) and 50% by weight of $B^{II}$).

In some embodiments, the MFRE values of the single polymers $B^I$) and $B^{II}$) are high. In some embodiments, "high" refers to the range of from 10 to 200 g/10 min., alternatively from 15 to 150 g/10 min. It is believed that high MFRE values provide fluidity of polymers in molten state.

In some embodiments, higher alpha-olefins are present as comonomers, in addition or in alternative to ethylene, in the butene-1 polymer component (B). In some embodiments, "higher alpha-olefins" are alpha-olefins of formula $CH_2 = CHR$ wherein R is methyl or an alkyl radical containing 3 to 8 or 3 to 6 carbon atoms. In some embodiments, the higher alpha-olefins are selected from the group consisting of propylene, hexene-1, and octene-1.

In some embodiments, ethylene is the comonomer.

The butene-1 polymer component (B) has a measurable crystallinity, as demonstrated by the presence, in the Differential Scanning Calorimetry (DSC) pattern, of the melting temperature peaks of crystalline butene-1 polymers.

In some embodiments, the butene-1 polymer component (B) shows one or more melting peaks in the second DSC heating scan. In some embodiments, the temperature peak or peaks occur at temperatures equal to or lower than 100° C., alternatively equal to or lower than 85° C., alternatively from 40° C. to 100° C., alternatively from 40° C. to 85° C., the temperature peak or peaks are attributed to the melting point of crystalline form II of the butene-1 polymers (TmII), and the area under the peak (or peaks) is taken as the global melting enthalpy (DH TmII). In some embodiments, more than one peak is present and the highest (most intense) peak is taken as TmII.

In some embodiments, global DH TmII values for the butene-1 polymer component (B) are of 25 J/g or less, alternatively of from 0.2 to 25 J/g, alternatively from 0.2 to 20 J/g, alternatively from 4 to 15 J/g, measured with a scanning speed corresponding to 10° C./min.

In some embodiments, the butene-1 polymer component (B) shows one or more melting peaks. In some embodiments, the temperature peak or peaks occur at temperatures equal to or lower than 100° C., alternatively equal to or lower than 90° C., alternatively from 30° C. to 100° C., alternatively from 30° C. to 90° C., in a DSC heating scan carried out after aging. It is believed that the temperature peak or peaks are attributable to the melting point of crystalline form I of the butene-1 polymers (TmI) and the area under the peak (or peaks) is taken as the global melting enthalpy (DH TmI). In some embodiments, more than one peak is present and the highest (most intense) peak is taken as TmI.

In some embodiments, the global DH TmI values for the butene-1 polymer component (B) are of 50 J/g or less, alternatively of from 25 to 50 J/g, alternatively from 30 to 50 J/g, measured with a scanning speed corresponding to 10° C./min.

In some embodiments, the butene-1 polymer component (B) has a detectable content of crystalline form III. Crystalline form III is detectable via the X-ray diffraction method described in the Journal of Polymer Science Part B: Polymer Letters Volume 1, Issue 11, pages 587-591, November 1963, or Macromolecules, Vol. 35, No. 7, 2002.

In some embodiments, the X-ray crystallinity values for the butene-1 polymer component (B) are of from 10% to 50%, alternatively from 15% to 45%.

In some embodiments, the butene-1 polymer component (B) has at least one of the following further features:
- an intrinsic viscosity (IV) measured in tetrahydronaphthalene (THN) at 135° C. equal to lower than 0.98 dl/g, alternatively equal to lower than 0.95 dl/g, alternatively from 0.75 dl/g to 0.98 dl/g, alternatively from 0.75 dl/g to 0.95 dl/g;
- a Mw/Mn value from 1.5 to 4, alternatively from 1.5 to 3.5, alternatively from 1.5 to 2.5;
- Mw equal to or greater than 90,000 g/mol, alternatively from 90,000 to 200,000 g/mol, alternatively from 100,000 to 180,000 g/mol;
- a Mz value of 180,000 g/mol or higher, alternatively of 190,000 g/mol or higher, alternatively from 180,000 to 350,000 g/mol alternatively from 190,000 to 300,000 g/mol;
- isotactic pentads (mmmm) measured with $^{13}$C-NMR operating at 150.91 MHz higher than 90%; alternatively higher than 93%, alternatively higher than 95%;
- 4,1 insertions not detectable using a $^{13}$C-NMR operating at 150.91 MHz;
- a yellowness index lower than 0; alternatively from 0 to −10, alternatively from −1 to −9, alternatively from −1 to −5;
- a Shore D value equal to or lower than 50, alternatively equal to or lower than 45, alternatively from 15 to 50, alternatively from 15 to 45;
- a tensile stress at break, measured according to ISO 527, of from 10 MPa to 45 MPa, alternatively from 15 MPa to 40 MPa;
- a tensile elongation at break, measured according to ISO 527, of from 400% to 1000%; alternatively from 450% to 800%;
- a glass transition temperature of −18° C. or less, alternatively of −20° C. or less, wherein the lower limit is −30° C.;
- a density of 0.880 g/cm$^3$ or more, alternatively of 0.885 g/cm$^3$ or more; wherein the upper limit is of 0.899 g/cm$^3$;
- a flexural modulus of from 80 to 250 MPa, alternatively from 80 to 200 MPa, alternatively of from 100 to 250 MPa, alternatively from 100 to 200 MPa, alternatively of from 115 to 250 MPa, alternatively from 115 to 200 MPa.

In some embodiments, the butene-1 polymer component (B) is obtained by polymerizing the monomer(s) in the presence of a metallocene catalyst system obtainable by contacting:
- a stereorigid metallocene compound;
- an alumoxane or a compound capable of forming an alkyl metallocene cation; and, optionally,
- an organo aluminum compound.

In some embodiments, the stereorigid metallocene compound belongs to the following formula (I):

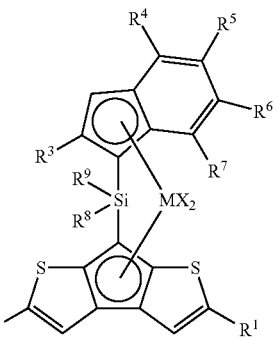

wherein:
M is an atom of a transition metal selected from those belonging to group 4; alternatively M is zirconium;
X, equal to or different from each other, is a hydrogen atom, a halogen atom, a R, OR, OR'O, OSO$_2$CF$_3$, OCOR, SR, NR$_2$ or PR$_2$ group wherein R is a linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radical, optionally containing heteroatoms belonging to groups 13-17 of the Periodic Table of the Elements; and R' is a C$_1$-C$_{20}$-alkylidene, C$_6$-C$_{20}$-arylidene, C$_7$-C$_{20}$-alkylarylidene, or C$_7$-C$_{20}$-arylalkylidene radical; alternatively X is a hydrogen atom, a halogen atom, a OR'O or R group; alternatively X is chlorine or a methyl radical;
R$^1$, R$^2$, R$^5$, R$^6$, R$^7$, R$^8$ and R$^9$, equal to or different from each other, are hydrogen atoms, or linear or branched, saturated or unsaturated C$_1$-C$_{20}$-alkyl, C$_3$-C$_{20}$-cycloalkyl, C$_6$-C$_{20}$-aryl, C$_7$-C$_{20}$-alkylaryl or C$_7$-C$_{20}$-arylalkyl radicals, optionally containing heteroatoms belonging to groups 13-17 of the Periodic Table of the Elements; in some embodiments, R$^5$ and R$^6$, and/or R$^8$ and R$^9$ form a saturated or unsaturated, 5 or 6 membered rings; in some embodiment, the ring bears C$_1$-C$_{20}$ alkyl radicals as substituents; with the proviso that at least one of R$^6$ or R$^7$ is a linear or branched, saturated or unsaturated C$_1$-C$_{20}$-alkyl radical, optionally containing heteroatoms belonging to groups 13-17 of the Periodic Table of the Elements; alternatively a C$_1$-C$_{10}$-alkyl radical;
R$^3$ and R$^4$, equal to or different from each other, are linear or branched, saturated or unsaturated C$_1$-C$_{20}$-alkyl radicals, optionally containing heteroatoms belonging to groups 13-17 of the Periodic Table of the Elements; alternatively R$^3$ and R$^4$ equal to or different from each other are $C_1$-$C_{10}$-alkyl radicals; alternatively $R^3$ is a methyl, or ethyl radical; and $R^4$ is a methyl, ethyl or isopropyl radical.

In some embodiments, the compounds of formula (I) have formula (Ia):

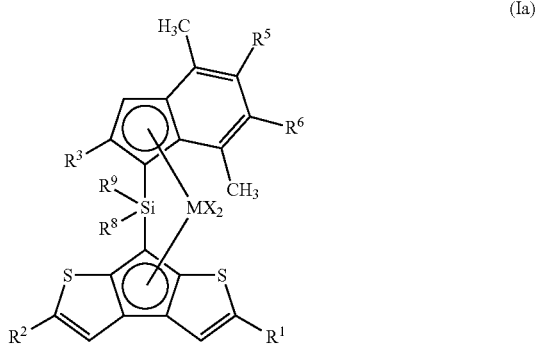

(Ia)

wherein:
M, X, $R^1$, $R^2$, $R^5$, $R^6$, $R^8$ and $R^9$ are as described above; $R^3$ is a linear or branched, saturated or unsaturated $C_1$-$C_{20}$-alkyl radical, optionally containing heteroatoms belonging to groups 13-17 of the Periodic Table of the Elements; alternatively $R^3$ is a $C_1$-$C_{10}$-alkyl radical; alternatively $R^3$ is a methyl or ethyl radical.

In some embodiments, the metallocene compounds are selected from the group consisting of dimethylsilyl{(2,4,7-trimethyl-1-indenyl)-7-(2,5-dimethyl-cyclopenta[1,2-b:4,3-b']-dithiophene)} zirconium dichloride; dimethylsilanediyl{(1-(2,4,7-trimethylindenyl)-7-(2,5-dimethyl-cyclopenta[1,2-b:4,3-b']-dithiophene)}Zirconium dichloride and dimethylsilanediyl{(1-(2,4,7-trimethylindenyl)-7-(2,5-dimethyl-cyclopenta[1,2-b:4,3-b']-dithiophene)}zirconium dimethyl.

In some embodiment, the alumoxanes are selected from the group consisting of methylalumoxane (MAO), tetra-(isobutyl)alumoxane (TIBAO), tetra-(2,4,4-trimethyl-pentyl)alumoxane (TIOAO), tetra-(2,3-dimethylbutyl)alumoxane (TDMBAO) and tetra-(2,3,3-trimethylbutyl) alumoxane (TTMBAO).

In some embodiments, the compounds capable of forming an alkylmetallocene cation are compounds of formula $D^+E^-$, wherein $D^+$ is a Brönsted acid, able to donate a proton and react irreversibly with a substituent X of the metallocene of formula (I) and $E^-$ is a compatible anion, which is able to stabilize the active catalytic species originating from the reaction of the two compounds and be removed by an olefinic monomer. In some embodiments, the anion $E^-$ is made from or containing of one or more boron atoms.

In some embodiments, the organo aluminum compound is selected from the group consisting of trimethylaluminum (TMA), triisobutylaluminum (TIBA), tris(2,4,4-trimethylpentyl)aluminum (TIOA), tris(2,3-dimethylbutyl)aluminum (TDMBA) and tris(2,3,3-trimethylbutyl)aluminum (TTMBA).

In some embodiment, the catalyst system and polymerization processes employing the catalyst system are as described in Patent Cooperation Treaty Publication Nos. WO2004099269 and WO2009000637.

In some embodiments, in the presence of the catalysts, butene-1 polymer component (B) is prepared directly in polymerization.

In some embodiments, the butene-1 polymer component (B) is a composition (II), the single polymers are prepared separately, and then blended together in the molten state by polymer processing apparatuses. In some embodiments, the composition (II) is made from or containing the previously described butene-1 polymers $B^I$) and $B^{II}$). In some embodiments, the polymer processing apparatuses are mono- and twin screw extruders.

In some embodiments, the polymerization process includes at least two sequential stages, carried out in two or more reactors connected in series, wherein the polymers are prepared in separate subsequent stages, operating in each stage, except for the first stage, in the presence of the polymer formed and the catalyst used in the preceding stage. In some embodiments, the polymers are $B^I$) and $B^{II}$).

In some embodiments, the polymerization process is carried out in liquid phase, optionally in the presence of an inert hydrocarbon solvent, or in gas phase, using fluidized bed or mechanically agitated gas phase reactors.

In some embodiments, two or more polymerization stages are carried out and the catalyst is added in the first reactor. In some embodiments, the catalyst is added in more than the first reactor.

In some embodiments, the hydrocarbon solvent is aromatic or aliphatic. In some embodiments, the aromatic hydrocarbon solvent is toluene. In some embodiments, the aliphatic hydrocarbon solvent is selected from the group consisting of propane, hexane, heptane, isobutane, cyclohexane, 2,2,4-trimethylpentane, and isododecane.

In some embodiments, the polymerization process is carried out by using liquid butene-1 as polymerization medium. In some embodiments, the polymerization temperature is from 20° C. to 150° C., alternatively between 50° C. and 90° C., alternatively from 65° C. to 82° C.

In some embodiments, the concentration of hydrogen in the liquid phase during the polymerization reaction (molar ppm $H_2$/butene-1 monomer) is from 400 ppm to 950 ppm, alternatively from 450 ppm to 900 ppm.

In some embodiments, the amount of comonomer in the liquid phase is from 0.1% to 8% by weight, alternatively from 0.2% to 6% by weight, with respect to the total weight of comonomer and butene-1 monomer present in the polymerization reactor. In some embodiments, the comonomer is ethylene.

In some embodiments, the butene-1 polymer component (B) is blended with the polymer component (A) in neat form, alternatively as part of a concentrate, wherein component (B) is previously dispersed in a propylene polymer resin. In some embodiments, the propylene polymer resin is the same as or different from polymer component (A). The concentrate thus prepared is then blended with the polymer component (A).

In some embodiments, the blending step is carried out by mixing polymer component (A), polymer component (B) or the concentrate thereof, and additives in a blender at a temperature equal to or higher than the polymer softening temperature, thereby dispersing the components. Then, the composition is processed by extruding and pelletizing. In some embodiments, the blender is a Henschel or Banbury mixer.

In some embodiments, the components (A) and (B) are directly fed to the apparatus used for preparing the fibers, without an extrusion step. In some embodiments and after mixing in solid state, the components (A) and (B) are directly fed to the apparatus.

In some embodiments, the polyolefin composition is added with additives and/or peroxides. In some embodiments, the peroxides are added to achieve a certain Melt Flow Rate.

In some embodiments, the additives are selected from the group consisting of pigments, opacifiers, fillers, stabilizers, flame retardants, antacids and whiteners.

In some embodiments, fibers or filaments are made from or containing the polyolefin composition are prepared by melt-spinning the polyolefin composition. In some embodiments, the device for preparing the fibers or filaments produce single or composite fibers or filaments.

In some embodiments, the composite fibers or filaments have a "skin-core structure".

As used herein, the term "fibers or filaments having a skin-core structure" refers to fibers or filaments having an axially extending interface and at least two components, that is, at least an inner core and at least an outer skin, wherein the components are made from or containing different polymeric materials, and the inner core and the outer skin are joined along the axially extending interface. In some embodiments and in the skin-core fibers or filaments, the skin thickness is uniform around the circumference of a fiber or filament cross-section. In some embodiments and in the skin-core fibers or filaments, the skin thickness is not be uniform around the circumference of the fiber or filament cross-section.

In some embodiments, the fibers or filaments having skin-core structure are produced using melt-spin equipment having eccentric or concentric annular dies. In some embodiments, the polyolefin composition is used for producing the outer skin of fibers or filaments having a skin-core structure. In some embodiments, the inner core is made from or containing a polymeric material used for spunbonding applications. In some embodiments, the selection of the polymeric material for the inner core depends on end properties of the composite fibers or filaments. In some embodiments, the skin-core fibers or filaments are made from or containing 50-80% by weight, alternatively 55-75% by weight, of polymeric material forming the core-layer and 20-50% by weight, alternatively 25-45% by weight, of polymer material made from or containing the polyolefin composition, forming the outer skin-layer, with respect to the total weight of the fibers or filaments.

In some embodiments, the composite fibers or filaments have a "side-by-side structure".

As used herein, the term "fibers or filaments having a side-by-side structure" refers to fibers or filaments wherein the two fiber components are not arranged a first fiber inside the second fiber, as in the skin-core structure, but rather in side-adjacent portions of the fibers or filaments.

In some embodiments and in the composite fibers, the inner core, or the side-by-side structure, the fiber component or components not containing the present polyolefin composition are made from or containing a propylene polymer selected from the same homopolymers or copolymers of component (A), equal to or different from the component (A) present in the skin or other fiber component or components containing the present polyolefin composition.

In some embodiments, the fibers have a diameter of 10 to 50 micrometers.

In some embodiments, the fabric is prepared by processes for the preparation of spun-bond non-woven fabrics, spreading the fibers to form a fiber web and calendaring to obtain the non-woven fabric.

In some embodiments and in spunbonding process, the polymer is heated in an extruder to the melting point of the polyolefin composition and then the molten polyolefin composition is pumped under pressure through a spinneret containing a number of orifices of a certain diameter, thereby producing filaments of the molten polymer composition and without subjecting the filaments to a subsequent drawing.

In some embodiments, the equipment includes an extruder with a die on the extruder's spinning head, a cooling tower, and an air suction gathering device that uses Venturi tubes.

In some embodiments and underneath this device that uses air speed to control the filaments speed, the filaments are gathered over a conveyor belt, where filaments are distributed to form a web.

In some embodiments, spunbonding machinery is used with the following process conditions:
- the output per hole ranges from 0.3-0.8 g/min, alternatively from 0.4-0.6 g/min;
- the molten polymer filaments fed from the face of the spinneret are cooled by air flow and solidified as a result of cooling;
- the spinning temperature is between 2000 and 300° C.

The filaments are then brought by the conveyor belt to the thermal bonding step, which is carried out by calendaring through a couple of heated rolls.

In some embodiments, the fibers or filaments are used and the balance of mechanical properties is achieved with relatively low thermal bonding temperatures. As used herein, the term "relatively low thermal bonding" includes the range of from 120° C. to 170° C.

In some embodiments, the fabric is a monolayer or multilayer non-woven fabric. In some embodiments, the non-woven fabric is multilayered and at least a first layer fibers made from or containing fibers formed from the polyolefin composition. In some embodiments, a second layer is obtained by spinning processes other than spunbonding. In some embodiment, the second layer is made from or containing other types of polymers.

In some embodiments, the non-woven fabric has a density of 10 to 120 grams per square meter, alternatively from 20 to 110, alternatively from 30 to 100 grams per square meter.

In some embodiments, tenacity and elongation at break of the non-woven fabric range from 10 to 200 N/cm and from 25% to 150% respectively.

EXAMPLES

Various embodiments, compositions and methods as provided herein are disclosed below in the following examples. These examples are illustrative, and are not intended to limit the scope of the disclosure.

The following analytical methods are used to characterize the polymer compositions and the non-woven fabric.

Thermal Properties (Melting Temperatures and Enthalpies)

Determined by Differential Scanning Calorimetry (D.S.C.) on a Perkin Elmer DSC-7 instrument, as hereinafter described.

For the determination of TmII (the melting temperature measured in the second heating run) a weighed sample (5-10 mg) obtained from the polymerization was sealed into an aluminum pan and heated at 200° C. with a scanning speed corresponding to 10° C./minute. The sample was kept at 200° C. for 5 minutes, thereby allowing complete melting of the crystallites and cancelling the thermal history of the sample. Successively, after cooling to −20° C. with a scanning speed corresponding to 10° C./minute, the peak temperature was taken as the crystallization temperature (Tc). After standing for 5 minutes at −20° C., the sample was heated for a second time at 200° C. with a scanning speed corresponding to 10° C./min. In this second heating run, the peak temperature measured was taken as (TmII). If more than one peak was present, the highest (most intense) peak was taken as TmII. The area under the peak (or peaks) was taken as global melting enthalpy (DH TmII).

The melting enthalpy and the melting temperature were also measured after aging (without cancelling the thermal history) as follows by using Differential Scanning Calorimetry (D.S.C.) on a Perkin Elmer DSC-7 instrument. A weighed sample (5-10 mg) obtained from the polymerization was sealed into an aluminum pan and heated at 200° C. with a scanning speed corresponding to 10° C./minute. The sample was kept at 200° C. for 5 minutes, thereby allowing complete melting of the crystallites. The sample was then stored for 10 days at room temperature. After 10 days, the sample was subjected to DSC, cooled to −20° C., and then the sample was heated at 200° C. with a scanning speed corresponding to 10° C./min. In this heating run, the peak temperature was taken as the melting temperature (TmI). If more than one peak was present, the highest (most intense) peak was taken as TmI. The area under the peak (or peaks) was taken as global melting enthalpy after 10 days (DH TmI).

MFR

Determined according to norm ISO 1133-2:2011 with a load of 2.16 kg at 190° C. (standard die) for MFRE and with a load of 2.16 kg at 230° C. for MFRL.

Intrinsic Viscosity

Determined according to norm ASTM D 2857-16 in tetrahydronaphthalene at 135° C.

Density

The density of samples was measured according to ISO 1183-1:2012 at 23° C. (ISO 1183-1 method A "Methods for determining the density of non-cellular plastics—Part 1: Immersion method, liquid pycnometer method and titration method"; Method A: Immersion method, for solid plastics (except for powders) in void-free form). Test specimens were taken from compression molded plaques conditioned for 10 days before carrying out the density measure.

Comonomer Contents

Comonomer contents were determined via FT-IR.

The spectrum of a pressed film of the polymer was recorded in absorbance vs. wavenumbers (cm$^{-1}$). The following measurements were used to calculate the ethylene content:

a) area ($A_t$) of the combination absorption bands between 4482 and 3950 cm$^{-1}$, which was used for spectrometric normalization of film thickness.

b) factor of subtraction (FCR$_{C2}$) of the digital subtraction between the spectrum of the polymer sample and the absorption band due to the sequences BEE and BEB (B: butene-1 units, E: ethylene units) of the methylenic groups (CH$_2$ rocking vibration).

c) Area ($A_{C2,block}$) of the residual band after subtraction of the C$_2$PB spectrum, which comes from the sequences EEE of the methylenic groups (CH$_2$ rocking vibration).

Apparatus

A Fourier Transform Infrared spectrometer (FTIR) was used.

A hydraulic press with platens heatable to 200° C. (Carver or equivalent) was used.

Method

Calibration of (BEB+BEE) Sequences

A calibration straight line was obtained by plotting % (BEB+BEE)wt vs. FCR$_{C2}$/A$_t$. The slope G$_r$ and the intercept I$_r$ were calculated from a linear regression.

Calibration of EEE Sequences

A calibration straight line was obtained by plotting % (EEE)wt vs. A$_{C2,block}$/A$_t$. The slope G$_H$ and the intercept I$_H$ were calculated from a linear regression.

Sample Preparation

Using a hydraulic press, a thick sheet was obtained by pressing about 1.5 g of sample between two aluminum foils. If homogeneity was in question, a minimum of two pressing operations were performed. A small portion was cut from the sheet to mold a film. The film thickness ranged between 0.1-0.3 mm.

The pressing temperature was 140±10° C.

The IR spectrum of the sample film was collected as soon as the sample was molded.

Procedure

The instrument data acquisition parameters were as follows:

Purge time: 30 seconds minimum.
Collect time: 3 minutes minimum.
Apodization: Happ-Genzel.
Resolution: 2 cm$^{-1}$.
Collected the IR spectrum of the sample vs. an air background.

Calculation

Calculated the concentration by weight of the BEE+BEB sequences of ethylene units:

$$\%(BEE + BEB) = G_r \cdot \frac{FCR_{C2}}{A_t} + I_r$$

Calculated the residual area (AC2, block) after the subtraction, using a baseline between the shoulders of the residual band.

Calculated the concentration by weight of the EEE sequences of ethylene units:

$$\%(EEE)\,\text{wt} = G_H \cdot \frac{A_{C2,block}}{A_t} + I_H$$

Calculated the total amount of ethylene percent by weight:

% C2 wt=[%(BEE+BEB)wt+%(EEE)wt]

NMR Analysis of Chain Structure $^{13}$C NMR spectra were acquired on a Bruker AV-600 spectrometer equipped with cryo-probe, operating at 150.91 MHz in the Fourier transform mode at 120° C.

The peak of the T$_{\beta\delta}$ carbon (nomenclature according to C. J. Carman, R. A. Harrington and C. E. Wilkes, *Macromolecules*, 10, 3, 536 (1977)) was used as an internal reference at 37.24 ppm. The samples were dissolved in 1,1,2,2-tetrachloroethane-d2 at 120° C. with an 8% wt/v concentration. Each spectrum was acquired with a 900 pulse, 15 seconds of delay between pulses and CPD to remove $^{1}$H-$^{13}$C coupling. About 512 transients were stored in 32K data points using a spectral window of 9000 Hz.

The assignments of the spectra, the evaluation of triad distribution and the composition were made according to Kakugo [M. Kakugo, Y. Naito, K. Mizunuma and T. Miyatake, *Macromolecules*, 16, 4, 1160 (1982)] and Randall [J. C. Randall, *Macromol. Chem Phys.*, C30, 211 (1989)] using the following:

$$BBB = 100(T_{\beta\beta})/S = I5$$

$$BBE = 100T_{\beta\delta}/S = I4$$

$$EBE = 100P_{\delta\delta}/S = I14$$

$$BEB = 100S_{\beta\beta}/S = I13$$

$$BEE = 100S_{\alpha\delta}/S = I7$$

$$EEE = 100(0.25S_{\gamma\delta} + 0.5S_{\delta\delta})/S = 0.25I9 + 0.5I10$$

| Area | Chemical Shift | Assignments | Sequence |
|---|---|---|---|
| 1 | 40.40-40.14 | Sαα | BBBB |
| 2 | 39.64 | Tδδ | EBE |
|   | 39-76-39.52 | Sαα | BBBE |
| 3 | 39.09 | Sαα | EBBE |
| 4 | 37.27 | Tβδ | BBE |
| 5 | 35.20-34.88 | Tββ | BBB |
| 6 | 34.88-34.49 | Sαγ | BBEB + BEBE |
| 7 | 34.49-34.00 | Sαδ | EBEE + BBEE |
| 8 | 30.91 | Sγγ | BEEB |
| 9 | 30.42 | Sγδ | BEEE |
| 10 | 29.90 | Sδδ | EEE |
| 11 | 27.73-26.84 | Sβδ + 2B$_2$ | BBB + BBE EBEE + BBEE |
| 12 | 26.70 | 2B$_2$ | EBE |
| 13 | 24.54-24.24 | Sββ | BEB |
| 14 | 11.22 | Pδδ | EBE |
| 15 | 11.05 | Pβδ | BBE |
| 16 | 10.81 | Pββ | BBB |

To a first approximation, the mmmm was calculated using 2B2 carbons as follows:

| Area | Chemical shift | assignments |
|---|---|---|
| B1 | 28.2-27.45 | mmmm |
| B2 | 27.45-26.30 | |

$$mmmm = B_1 \cdot 100/(B_1 + B_2 - 2 \cdot A_4 - A_7 - A_{14})$$

Mw/Mn and Mz Determination by GPC

Measured by way of Gel Permeation Chromatography (GPC) in 1,2,4-trichlorobenzene (TCB). Molecular weight parameters (Mn, Mw, Mz) and molecular weight distributions Mw/Mn for the samples were measured by using a GPC-IR apparatus by PolymerChar, which was equipped with a column set of four PLgel Olexis mixed-bed (Polymer Laboratories) and an IR5 infrared detector (PolymerChar). The dimensions of the columns were 300×7.5 mm and the particle size was 13 μm. The mobile phase flow rate was kept at 1.0 mL/min. The measurements were carried out at 150° C. Solution concentrations were 2.0 mg/mL (at 150° C.) and 0.3 g/L of 2,6-di-tert-butyl-p-cresol were added to prevent degradation. For GPC calculation, a calibration curve was obtained using 12 polystyrene (PS) reference samples supplied by PolymerChar (peak molecular weights ranging from 266 to 1220000). A third-order polynomial fit was used to interpolate the experimental data and obtain the relevant calibration curve. Data acquisition and processing were done by using Empower 3 (Waters). The Mark-Houwink relationship was used to determine the molecular weight distribution and the relevant average molecular weights: the K values were $K_{PS}=1.21\times10^{-4}$ dL/g and $K_{PB}=1.78\times10^{-4}$ dL/g for PS and polybutene (PB) respectively, while the Mark-Houwink exponents α=0.706 for PS and α=0.725 for PB were used.

For butene/ethylene copolymers, the composition of each sample was assumed constant in the whole range of molecular weight and the K value of the Mark-Houwink relationship was calculated using a linear combination as reported below:

$$K_{EB} = x_E K_{PE} + x_B K_{PB}$$

where $K_{EB}$ is the constant of the copolymer, $K_{PE}$ (4.06×10$^{-4}$, dL/g) and $K_{PB}$ (1.78×10$^{-4}$ dL/g) are the constants of polyethylene (PE) and PB, $x_E$ and $x_B$ are the ethylene and the butene weight relative amount with $x_E+x_B=1$. The Mark-Houwink exponents α=0.725 were used for the butene/ethylene copolymers independently on each composition. End processing data treatment was fixed for the samples to include fractions up at 1000 in terms of molecular weight equivalent. Fractions below 1000 were investigated via GC.
Fractions Soluble and Insoluble in Xylene at 0° C. (XS-0° C.)

2.5 g of polymer composition and 250 cm$^3$ of o-xylene were introduced into a glass flask equipped with a refrigerator and a magnetic stirrer. The temperature was raised up to the boiling point of the solvent. The resulting clear solution was then kept under reflux and stirring for further 30 minutes. The closed flask was then cooled to 100° C. in air for 10 to 15 minutes under stirring and then kept for 30 minutes in a thermostatic water bath at 0° C. for 60 minutes. The resulting solid was filtered on quick filtering paper at 0° C. 100 cm$^3$ of the filtered liquid was poured in a pre-weighed aluminum container which was heated on a heating plate under nitrogen flow, thereby removing the solvent by evaporation. The percent by weight of polymer soluble (Xylene Solubles at 0° C.=XS 0° C.) was calculated from the average weight of the residues. The insoluble fraction in o-xylene at 0° C. (xylene Insolubles at 0° C.=XI %0° C.) was:

$$XI\,\%0°\,C. = 100 - XS\,\%0°\,C.$$

Fractions Soluble and Insoluble in o-Xylene at 25° C. (XS-25° C.)

2.5 g of polymer were dissolved in 250 ml of xylene, at 135° C., under agitation. After 20 minutes, the solution was cooled to 25° C. under stirring, and then is the solution was allowed to settle for 30 minutes. The precipitate was filtered with filter paper; the solution was evaporated under a nitrogen current, and the residue dried under vacuum at 80° C. until constant weight. The percent by weight of polymer soluble (Xylene Soluble at 25° C.=XS 25° C.) was calculated from the residue. The insoluble fraction in o-xylene at 0° C. (Xylene Insoluble at 25° C.=XI 25° C.) was:

$$XI\,\%25°\,C. = 100 - XS\,\%25°\,C.$$

The percent by weight of polymer insoluble in xylene at ambient temperature (25° C.) was considered the isotactic index of the polymer. It is believed that this value corresponds to the isotactic index determined by extraction with boiling n-heptane, which by definition constitutes the isotactic index of polypropylene.

Determination of X-Ray Crystallinity

The X-ray crystallinity was measured with an X-ray Diffraction Powder Diffractometer (XDPD) that used the Cu-Kul radiation with fixed slits and able to collect spectra between diffraction angle 2Θ=5° and 2Θ=35° with step of 0.1° every 6 seconds. The samples were diskettes of about 1.5-2.5 mm of thickness and 2.5-4.0 cm of diameter made by compression molding. The diskettes were aged at room temperature (23° C.) for 96 hours. After this preparation, the specimen was inserted in the XDPD sample holder. The XRPD instrument was set to collect the XRPD spectrum of the sample from diffraction angle 2Θ=5° to 2Θ=35° with steps of 0.1° by using counting time of 6 seconds. At the end, the final spectrum was collected.

Ta was defined as the total area between the spectrum profile and the baseline expressed in counts/sec·2Θ. Aa was defined as the total amorphous area expressed in counts/sec·2Θ. Ca was defined as the total crystalline area expressed in counts/sec·2Θ.

The spectrum or diffraction pattern was analyzed in the following steps:
1) defined a linear baseline for the whole spectrum and calculated the total area (Ta) between the spectrum profile and the baseline;
2) defined an amorphous profile, along the whole spectrum that separated the amorphous regions from the crystalline regions according to the two phase model;
3) calculated the amorphous area (Aa) as the area between the amorphous profile and the baseline;
4) calculated the crystalline area (Ca) as the area between the spectrum profile and the amorphous profile as Ca=Ta−Aa; and
5) calculated the degree of crystallinity (% Cr) of the sample using the formula:

$$\% \, Cr = 100 \times Ca/Ta$$

Flexural Modulus

According to norm ISO 178:2010, measured 10 days after molding.

Shore D

According to norm ISO 868:2003, measured 10 days after molding.

Tensile Stress and Elongation at Break

According to norm ISO 527-1:2012 on compression molded plaques, measured 10 days after molding.

Glass Transition Temperature Via DMTA (Dynamic Mechanical Thermal Analysis)

Molded specimens of 76 mm by 13 mm by 1 mm were fixed to the DMTA machine for tensile stress. The frequency of the tension and relies of the sample was fixed at 1 Hz. The DMTA translated the elastic response of the specimen starting from −100° C. to 130° C. The elastic response was plotted versus temperature. The elastic modulus for a viscoelastic material was defined as E=E'+iE". In some instances, the DMTA split the two components E' and E" by resonance and plotted E' vs temperature and E'/E"=tan (δ) vs temperature.

The glass transition temperature Tg was assumed to be the temperature at the maximum of the curve E'/E"=tan (δ) vs temperature.

Yellowness Index

Determined accordingly to ASTM D1925.

Tenacity and Elongation at Break of Non-Woven Fabrics

Test pieces 50 mm large and about 100 mm long were obtained by cutting the non-woven fabrics, with the longer side in the Machine Direction (MD), corresponding to the direction of movement of the spun-bond conveyor belt, or in the Transverse Direction (TD), perpendicular to the Machine direction. The two opposite 50 mm sides of the sample were fixed to the clamps of an Instron dynamometer (model 1122) and tensioned to break with a traction speed of 100 mm/min, the initial distance between the clamps being of 100 mm. The ultimate strength (load at break) and the elongation at break were determined. The ultimate strength, divided by 50 mm, was taken as the tenacity of the sample.

Both tenacity and elongation were measured in MD and TD, using the respectively cut test pieces.

Polymer Components Used in the Examples and Comparative Examples

Component (A)

As polymer component (A), an isotactic propylene homopolymer was used, having a MFRL of 25 g/10 min., a density of 0.9 g/cm³ and an isotactic index, measured as percentage by weight of fraction insoluble in xylene at 25° C., of 97.

Component (B)

As polymer component (B), a composition (II) was used, containing 42% by weight of B$^I$) and 58% by weight of B$^{II}$) and prepared as follows.

Preparation of the Metallocene Catalyst (A-1)

Dimethylsilyl{(2,4,7-trimethyl-1-indenyl)-7-(2,5-dimethyl-cyclopenta[1,2-b:4,3-b']-dithiophene)} zirconium dichloride (A-1) was prepared according to Example 32 of Patent Cooperation Treaty Publication No. WO0147939.

Preparation of the Catalytic Solution

Under nitrogen atmosphere, 8.1 L of a solution of 4.5% wt/v of TIBA in isododecane (1.84 mol of TIBA) and 760 mL of a solution 30% wt/wt of MAO in toluene (3.65 moles of MAO) were loaded in a 20 L jacketed glass reactor equipped with an anchor stirrer and allowed to react at room temperature for about 1 hour under stirring.

After this time, the metallocene A-1 (1.6 g, 2.75 mmol) was added and dissolved under stirring for about 30 minutes.

The final solution was discharged from the reactor into a cylinder through a filter to remove solid residues (if any).

The composition of the solution was as follows:

| Al g/L | Zr % w | Al/Zr mol ratio | Metallocene Conc. mg/L |
|---|---|---|---|
| 16.7 | 0.028 | 1996 | 181 |

Polymerization

The polymerization was carried out continuously in a pilot plant including two stirred reactors connected in series wherein liquid butene-1 constituted the liquid medium.

The catalytic solution was fed in both reactors.

The polymerization conditions are reported in Table 1.

TABLE 1

| | Composition (II) |
|---|---|
| Operative conditions (first reactor) | |
| Temperature (° C.) | 75 |
| H₂ in liquid phase (ppm mol) | 704 |
| C₂H₄ in liquid phase (weight %) | 0.4 |
| Mileage (kg/g Me) | 3035 |
| Split (weight %) | 42 |
| C₂H₄ content of B$^I$) (weight %) | 0.9 |
| C₂H₄ content of B$^I$) (mole %) | 1.8 |
| Operative conditions (second reactor) | |
| Temperature (° C.) | 75 |
| H₂ in liquid phase (ppm mol) | 690 |
| C₂H₄ in liquid phase (weight %) | 3.5 |
| Split (weight %) | 58 |

TABLE 1-continued

|  |  | Composition (II) |
| --- | --- | --- |
| $C_2H_4$ content of $B^{II}$ (weight %) |  | 6.3 |
| $C_2H_4$ content of $B^{II}$ (mole %) |  | 11.9 |
| Total mileage |  | 2797 |
| Total $C_2H_4$ content (mole %) |  | 7.6 |

Note:
$C_2H_4$ = ethylene; kg/g Me = kilograms of polymer per gram of metallocene catalyst (A-1); Split = amount of polymer produced in the concerned reactor.

In Table 2 the properties of the final composition (II) are specified.

TABLE 2

|  |  | Composition (II) |
| --- | --- | --- |
| MFR 190° 2.16 Kg | g/10 min | 37 |
| Intrinsic Viscosity | dl/g | 0.91 |
| $C_2H_4$ IR | mol % | 7.6 |
| TmII | ° C. | 82.1 |
| DH TmII | J/g | 7.7 |
| TmI | ° C. | 87.5 |
| DH TmI | J/g | 40.7 |
| X-Ray crystallinity | % | 34 |
| Xylene Soluble at 0° C. | % | 60 |
| Mw | g/mol | 145805 |
| Mn | g/mol | 65056 |
| Mw/Mn |  | 2.2 |
| Mz | g/mol | 253556 |
| Density | g/cm³ | 0.896 |
| Flexural Modulus | MPa | 124 |
| Strength at Break | MPa | 25 |
| Elongation at Break | % | 630 |
| Hardness Shore D | D | 36.1 |
| Glass transition temperature | ° C. | −24.1 |

Examples 1-6 and Comparative Examples 1-4: Preparation of the Non-Woven Fabrics Non-woven fabrics made of concentric skin-core composite filaments were prepared.

In Examples 1-8, the skin was made of a polyolefin composition obtained by mechanically blending, in the solid state, components (A) and (B) in the relative amounts reported in Tables 3 and 4.

In Comparative Examples 1-4, the skin was made of component (A).

In the examples, the core was made of component (A).

The polymer materials, namely, the polyolefin composition made from or containing components (A) and (B), or the component (A), for the filament skin, and component (A) for the filament core, were fed to a Reicofil 4 spunbond pilot line, which was run with the following settings and operative conditions:
  core/skin 70/30 (whole diameter: 0.6 mm);
  line speed (m/min): 214 (17 gsm*)–73 (50 gsm);
  spinneret: 7377 holes (6827 holes/m);
  gap pre-diffusor (exit): 23 mm;
  secondary air gap-right/left: 14 mm;
  gap diffusor exit: 75 mm;
  distance above the belt right/left: 131 mm.
  gsm=grams per square meter.

The thermal bonding was carried out with the hot rolls at the temperatures reported in Table 3.

Thus, non-woven fabrics made of composite filaments with concentric core and skin structure in a weight ratio of 70% of core and 30% of skin, with a density of 17 or 50 grams per square meter (gsm).

The mechanical properties of the non-woven fabrics are reported in Tables 3 and 4 as well.

TABLE 3

| Example |  | Ex. 1 | Ex. 2 | Ex. 3 |
| --- | --- | --- | --- | --- |
| Skin composition: amount of (A) | [% by weight] | 90 | 90 | 70 |
| Skin composition: amount of (B) | [% by weight] | 10 | 10 | 30 |
| gsm | [g/m²] | 17 | 17 | 17 |
| Thermal bonding temperature | [° C.] | 130 | 140 | 130 |
| Non-woven properties |  |  |  |  |
| Tenacity MD | [N/5 cm] | 27.27 | 40.68 | 38.17 |
| Tenacity TD | [N/5 cm] | 13.39 | 22.61 | 23.35 |
| Elongation MD | [%] | 35 | 55 | 66 |
| Elongation TD | [%] | 44 | 61 | 78 |

| Example |  | Ex. 4 | Comp. Ex.1 | Comp. Ex.2 |
| --- | --- | --- | --- | --- |
| Skin composition: amount of (A) | [% by weight] | 70 | 100 | 100 |
| Skin composition: amount of (B) | [% by weight] | 30 | 0 | 0 |
| gsm | [g/m²] | 17 | 17 | 17 |
| Thermal bonding temperature | [° C.] | 140 | 130 | 140 |
| Non-woven properties |  |  |  |  |
| Tenacity MD | [N/5 cm] | 39.73 | 19.08 | 34.12 |
| Tenacity TD | [N/5 cm] | 26.17 | 10.31 | 15.57 |
| Elongation MD | [%] | 70 | 19 | 38 |
| Elongation TD | [%] | 79 | 28 | 39 |

Note:
MD = Machine Direction; TD = Transverse Direction
Comp. = Comparative

TABLE 4

| Example |  | Ex. 5 | Ex. 6 | Comp. Ex. 3 | Comp. Ex. 4 |
| --- | --- | --- | --- | --- | --- |
| Skin composition: amount of (A) | [% by weight] | 90 | 90 | 100 | 100 |
| Skin composition: amount of (B) | [% by weight] | 10 | 10 | 0 | 0 |
| gsm | [g/m²] | 50 | 50 | 50 | 50 |
| Thermal bonding temperature | [° C.] | 153 | 163 | 153 | 163 |
| Non-woven properties |  |  |  |  |  |
| Tenacity MD | [N/5 cm] | 137.97 | 156.55 | 101.4 | 141.4 |
| Tenacity TD | [N/5 cm] | 91.98 | 101 | 60.84 | 90.9 |
| Elongation MD | [%] | 110.7 | 126.9 | 66.0 | 97.1 |
| Elongation TD | [%] | 111.7 | 120.2 | 63.3 | 104.9 |

What is claimed is:

1. A fiber comprising:
  a polyolefin composition comprising:
  A) 60-95% by weight of:
    a propylene homopolymer having an isotactic index, measured as percentage by weight of fraction insoluble xylene at 25° C., higher than 80, or
    a crystalline copolymer of propylene with ethylene and/or one or more alpha-olefins having 4-10 carbon atoms, containing 85% by weight or more of propylene and having an isotactic index equal to or higher than 80, or of a blend thereof; and B) 5-40% by weight of
  a copolymer (I), wherein the copolymer (I) is a copolymer of butene-1 with one or more comonomers selected from the group consisting of ethylene and higher alpha-olefins, or
  a composition (II), wherein composition (II) is a copolymer of butene-1 with one or more of comonomers,
  wherein the copolymer (I) or the composition (II) having:
  a MFRE value of from 25 to 100 g/10 min., wherein MFRE is the Melt Flow Rate, measured according to ISO 1133 at 190° C. with a load of 2.16 kg (condition E);
  a copolymerized comonomer content from 4% to 15% by mole;
  a Mw/Mn value, where Mw is the weight average molar mass and Mn is the number average molar mass, both measured by GPC, equal to or lower than 4; and flexural modulus of 80 MPa or higher;
  wherein amounts of A) and B) refer to a total weight of A)+B).

2. The fiber of claim 1, wherein the composition (II) comprises:

$B^I$) a butene-1 homopolymer or a copolymer of butene-1 with one or more comonomers selected from the group consisting of ethylene and higher alpha-olefins, having a copolymerized comonomer content ($C_A$) of up to 5% by mole; and $B^{II}$) a copolymer of butene-1 with one or more comonomers selected from the group consisting of ethylene and higher alpha-olefins, having a copolymerized comonomer content (CB) of from 6% to 20% by mole;

wherein the composition (II) has a content of fraction soluble in xylene at 0° C. of 75% by weight or less, determined on the total weight of $B^I$) and $B^{II}$).

3. The fiber according to claim 1, having a skin-core structure or side-by-side structure.

4. The fiber according to claim 3, wherein the fiber is a skin-core fiber having a skin component, wherein the skin component comprises the polyolefin composition.

5. A fabric comprising the fibers according to claim 1, wherein the fabric is a non-woven fabric.

6. The fabric according to claim 5, wherein the fabric has a density of 10 to 120 grams per square meter.

* * * * *